United States Patent [19]

Abeille et al.

[11] Patent Number: 4,939,612
[45] Date of Patent: Jul. 3, 1990

[54] TAPE GUIDE DEVICE FOR A MAGNETIC RECORDER/READER

[75] Inventors: Pierre Abeille, Sceaux; Jean-Claude Coulie, Boulogne-Billancourt, both of France

[73] Assignee: Schlumberger Industries, Montrouge, France

[21] Appl. No.: 312,152

[22] Filed: Feb. 21, 1989

[30] Foreign Application Priority Data

Feb. 26, 1988 [FR] France ................................ 88 02367

[51] Int. Cl.$^5$ .............................................. G11B 15/60
[52] U.S. Cl. .................................. 360/130.24; 360/84
[58] Field of Search ........................ 360/130.24, 84–85

[56] References Cited

U.S. PATENT DOCUMENTS 3,860,959  1/1975  Kudon ............................. 360/130.24
3,995,318  11/1976  Serizawa ........................ 360/130.24

Primary Examiner—A. J. Heinz
Attorney, Agent, or Firm—Sanford J. Asman

[57] ABSTRACT

A device for guiding a magnetic tape suitable for being wound helically around a cylindrical drum and for running past at least one magnetic head driven in rotation around the periphery of a slot provided in an equatorial plane of the drum, the device being of the type comprising elongate bearing means linked to the drum and defining at least two bearing points against which one of the edges (bottom edge or top edge) of the tape may bear, the device including link means linking the bearing means to the drum and suitable for modifying the inclination of the bearing means as a function of temperature said link means suitable under the effect of differential thermal expansion to cause the bearing means to rotate about a radial axis (extending transversely to the axis of the drum) passing through a point which is invariant in rotation, and whose position is fixed regardless of temperature.

12 Claims, 4 Drawing Sheets

TAPE GUIDE DEVICE FOR A MAGNETIC RECORDER/READER

The present invention relates to a tape guide device for a magnetic recorder/reader of the "rotating head" type in which information is disposed on the tape in parallel inclined segments.

BACKGROUND OF THE INVENTION

Such recorders comprise one or more magnetic read/write heads fixed at the periphery of a rotary element lying coaxially with the axis of a cylindrical drum, with a magnetic tape being wound helically around the surface of the drum and running from a payout spool to a takeup spool.

Recorders of this type constitute two families. In the first family, the heads are fixed on the periphery of a roating plate which is coaxial with the drum and they are disposed in a slot provided in an equatorial plane of the drum. Said magnetic tape wound helically round the drum runs past the slot. In the other family, the drum comprises a fixed bottom portion and a rotating top portion to which the heads are fixed.

The inclination of the tracks on the tape is mainly a function of the inclination of the tape relative to the plane of rotation of the heads.

In general, the inclination of the tracks is fixed by an official or a de facto standard.

Consequently, information recorded on the tape must be disposed thereon accurately, since otherwise, when reading, the heads no longer follow the tracks as recorded on the tape.

This assumes that the tape is guided accurately so that the tape runs over exactly the same location of the drum both when recording and when reading (particularly when recording and reading are performed on different apparatuses), or even during a single recording or reading operation (using the same apparatus).

By way of indication, a track is a few tens of microns wide.

It will be understood how important it is to guide the tape over the drum, with guidance being provided with an accuracy of a few microns.

Further, the continuing improvement in the performance of such recorders leads, in particular, to an increase in the quantity of information that can be processed. Thus, for given dimensions of the reel on which the tape is wound, it is desired to reduce the thickness of the tape or at least the layer of material constituting its backing, in order to increase the total length of wound tape.

It is normal practice for such thin backings to be made by stretching a thicker layer of backing material. This gives rise to thicknesses of a few tens of microns, or even of ten microns.

However, tapes of this type give rise to a major difficulty.

A tape which has been subjected to such treatment expands thermally in an anisotropic manner. Its coefficient of expansion is generally five times higher in the transverse direction than in the longitudinal direction.

As a result, the angle of inclination of the tracks on the tape varies with temperature. Thermal expansion gives rise to tape displacement relative to the drum both in translation and in rotation.

Consequently, if there is a change in temperature (e.g. between recording and reading, or even while recording), then the tracks can no longer be read back properly by the heads.

This give rise to a loss of information and thus a considerable reduction in recording reliability.

This drawback is totally unacceptable, in particular when temperatures vary over a wide range.

In prior art devices, the tape is guided either by means of wheels/pins disposed at the inlet and at the outlet of the drum, or else by a helical ramp applied to the drum or machined in the body thereof with one of the top or bottom edges of the tape bearing against the edge of the ramp.

However, none of the prior art devices solve the above-mentioned problem due to anisotropic thermal expansion of the tape.

The device of the invention seeks to remedy this drawback.

SUMMARY OF THE INVENTION

To this end, the present invention provides a device for guiding a magnetic tape suitable for being wound helically around a cylindrical drum and for running past at least one magnetic head driven in rotation around the periphery of a slot provided in an equatorial plane of the drum, the device being of the type comprising elongate bearing means linked to the drum and defining at least two bearing points against which one of the edges (bottom edge or top edge) of the tape may bear, the device including link means linking the bearing means to the drum and suitable for modifying the inclination of the bearing means as a function of temperature, said link means being suitable under the effect of differential thermal expansion to cause the bearing means to rotate about a radial axis (extending transversely to the axis of the drum) passing through a point which is invariant in rotation, and whose position is fixed regardless of temperature.

Preferably, the bearing means are constituted by a helical ramp.

In a first embodiment, the link means are constituted by fixing members, each of which is suitable for providing linear expansion whose value is a function of the position of the corresponding member along the ramp.

More precisely, the link means comprise a set of tabs distributed along the ramp and disposed parallel to the axis of the drum, each tab being fixed at one of its ends to the drum and at its other end to the base of the ramp, said tabs being constituted by a material whose coefficient of thermal expansion is different at least from that of the material constituting the drum, said tabs also being of increasing length depending on their position along the ramp.

Preferably, when the respective coefficients of thermal expansion of the tape and of the drum are of substantially the same value, one of the ends (in the longitudinal direction) of the ramp is fixed to the drum in such a manner as to constitute an invariant reference point.

For example, the ramp and the drum may be made of aluminum alloy with the tabs being made of an alloy of iron and nickel known under the trademark Invar.

In a second embodiment, the link means are suitable for allowing the bearing means to lengthen longitudinally relative to the drum by thermal expansion, and for transforming such longitudinal elongation into rotary motion about a radial axis.

More precisely, the ramp and the drum are made of materials having different coefficients of thermal expansion, with the link means comprising a set of pegs distributed along the drum in an axial direction and projecting from the surface thereof, said pegs being suitable for co-operating with openings provided in the ramp, said openings being generally elongate in shape along a direction which is inclined relative to the longitudinal direction of the ramp, and being of a width such as to constitute guide openings.

Preferably, when the respective coefficients of thermal expansion of the tape and the drum are of substantially the same value, the opening provided at one of the ends of the ramp is complementary in shape to the associated peg, such that said peg constitutes an invariant reference point in rotation.

BRIEF DESCRIPTION OF THE DRAWINGS

Embodiments of the invention are described by way of example with reference to the accompanying drawings, in which.

MORE DETAILED DESCRIPTION

Figure 1:
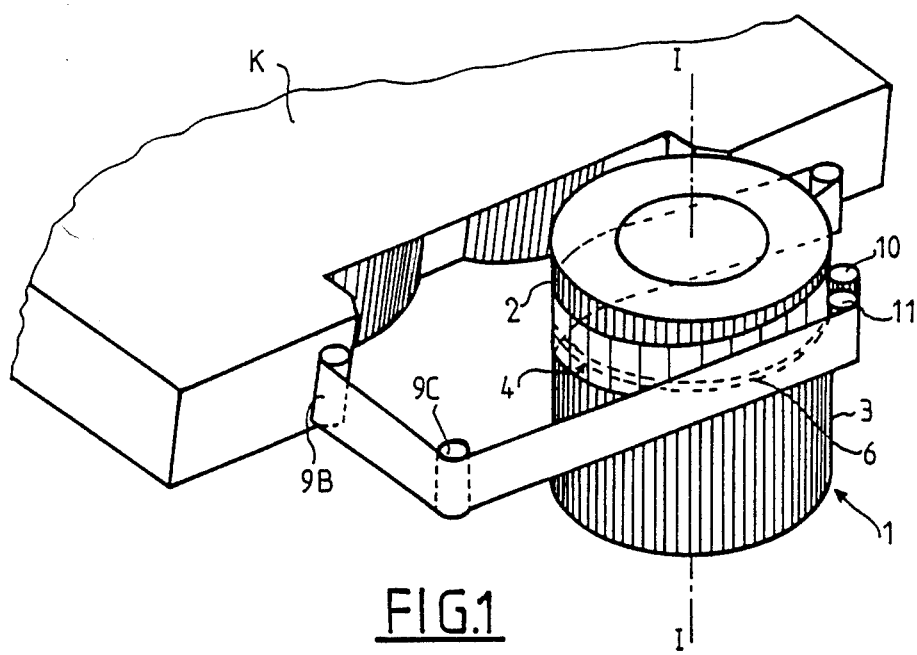
FIG. 1 is a diagrammatic perspective view of a recorder showing the tape path.

The device of the present invention is described below with reference to a recorder/reader apparatus having rotating magnetic heads of a type known per se, and shown diagrammatically in FIGS. 1 and 2.

The recorder/reader comprises a cylindrical drum 1 constituted by a top drum 2 and a bottom drum 3, which are separated from each other by a slot 4 disposed in an equatorial plane perpendicular to the axis I—I of the drum and substantially half-way up the drum.

A disk-shaped element is provided inside the slot and is suitable for being rotated about the axis I—I of the drum. The disk carries at least one, and generally several, magnetic heads 6 which are disposed regularly around its periphery and which project very slightly relative to the surface defined by the wall of the drum.

Figure 2:
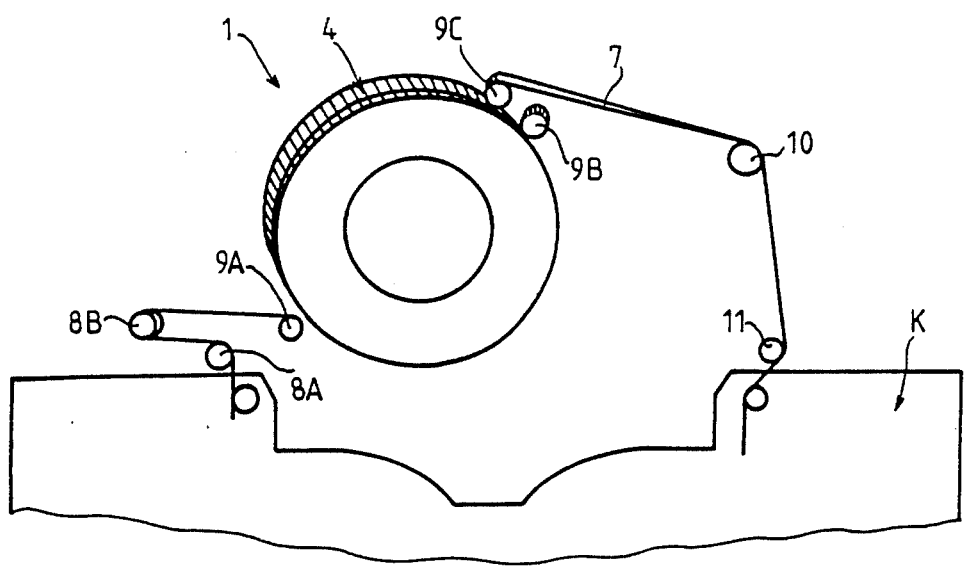
FIG. 2 is a plan view of FIG. 1.

A magnetic tape 7 is suitable for being wound helically around the drum 1 in order to form an omega-shape when seen in plane view, as shown in FIG. 2. A set of wheels 8A, 8B, 9A, 9B, 9C, 10, and 11 guide the tape 7 and keep it in this configuration as it runs from a payout spool towards a takeup spool (not shown and known per se), in a cassette K. Information is recorder on or read from the tape in parallel track segments which slope obliquely relative to the axis of the tape.

It should be understood that the invention is also suitable for being applied to a rotating head recorder in which the top portion of the drum rotates and carries the heads at its base.

Figure 3:
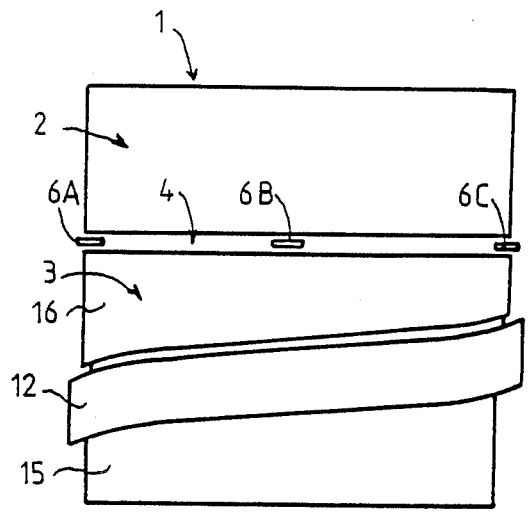
FIG. 3 is a side view of a drum provided with a device in accordance with the invention.
Figure 4:
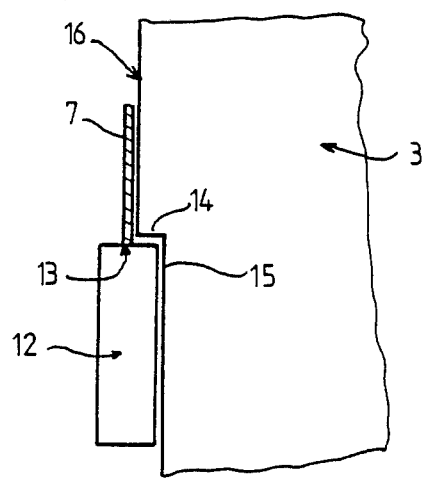
FIG. 4 is a section view showing a detail of the respective dispositions of the drum and of the ramp.

FIGS. 3 and 4 are diagrams of the guide device of the invention and they show its relationship with the drum 1.

The magnetic heads 6A, 6B, and 6C (only three of them are shown) rotate in the equatorial slot 4 of the drum 1. A magnetic tape 7 (FIG. 4) winds helically around the drum and its bottom edge rests on a helical guide ramp 12 placed against the bottom drum 3. The top edge 13 of the ramp 12 has a profile which corresponds to the tape path and which constitutes a guide surface for the tape.

The ramp is in the form of a rectangular section strip having its two large faces parallel to the surface of the drum.

The bottom drum 3 preferably includes a shoulder 14 defining a setback zone delimited by a cylindrical surface 15 defining the bottom drum (surface 16).

The ramp 12 is partially received in the setback zone while nevertheless projecting from the surface 16. Thus, the magnetic tape 7 (with only the bottom portion thereof being shown in FIG. 4) bears against the surface 16 of the drum and also bears against the top guide edge 13 of the ramp. Seen in plane view, i.e. with the drum and the ramp developed so they are flat, the top edge 13 constitutes a straight line segment which is inclined at a defined angle which is a function of the inclination of the tracks on the tape.

By way of example, the ramp may be 170 mm long and 10 mm high (for a drum having a diameter of 75 mm).

Means in accordance with the invention for linking the ramp to the drum are described in greater detail below with reference to FIGS. 5 and 6 which show a first embodiment of the invention.

Figure 5:
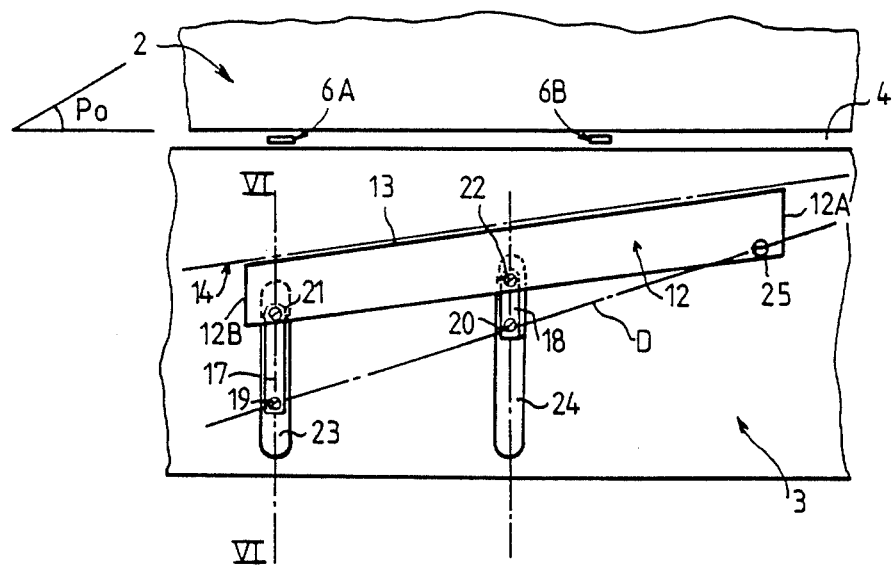
FIG. 5 is a diagrammatic developed view of a first embodiment of the device of the invention.

FIG. 5 shows a portion of the bottom drum 3 and of the top drum 2 shown in plane form with their surfaces being developed in the plane of the paper.

The ramp 12 and the drum 1 are made of materials having respective coefficient of thermal expansion having the same value (or values which are very close). Preferably, both the ramp and the drum are made of the same material, e.g. aluminum.

For reasons of convenience in language, the term "thermal expansion" is used below to cover any change in length (expansion or contraction) due to a temperature effect.

The ramp is linked to the drum by means of tabs 17 and 18 which are disposed parallel to the drum axis. Each tab has its bottom end fixed to the drum by a respective screw 19 or 20, and has its top end fixed to the ramp 12 by a respective screw 21 or 22. Preferably, the bottom drum 3 includes grooves 23 and 24 disposed beneath the first above-mentioned shoulder 14 and suitable for receiving respective ones of the tabs 17 and 18.

The tabs are uniformly distributed along the guide ramp and are of increasing length going from one end 12A of the ramp to its other end 12B. In the example shown in FIG. 5, there are two tabs 17 and 18 disposed respectively at one end 12B and in the middle of the ramp, with the other end 12A being fixed directly to the drum by means of a screw 25.

The lengths of the tabs are such that the three points where the ramp is fixed to the drum, as defined by the three screws 19, 20, and 25 respectively, are in alignment on a straight line D.

The fixing tabs 17 and 18 are made of materials having identical coefficients of thermal expansion. The tabs are preferably made of the same material, e.g. an alloy of iron and nickel (known under the trademark Invar).

Further, the tabs 17 and 18 are made of a material whose coefficient of thermal expansion is substantially different from the coefficient of thermal expansion, at least of the drum.

Thus, for a given temperature T1 of ambient air in which the recorder/reader is operating and/or of the drum/tape assembly, the top edge 13 of the guide ramp 12 defines a straight line D (in the plane view) at an inclination ALPHA1 relative to a reference plane Po which is defined as being the plane of rotation of the heads.

When there is a change in temperature, either between recording and reading or during a single reading or recording operation, with the temperature taking up a new value T2 (where T2 is different from T1), there is no differential expansion between the ramp and the drum, both of which expand by the same amount and each of which remains geometrically similar in shape to its previous shape.

In contrast, since the tabs are made of a material having a coefficient of thermal expansion which is different from the coefficient of the drum-forming material, the expansion of the tabs gives rise to relative displacement of the ramp parallel to the drum axis.

The longer the length of a tab, the longer its absolute elongation.

Consequently, the ramp is rotated about a radial axis extending transversely to the drum axis and passing through the invariant fixing point defined by the screw 25 (which is close to one of the ends of the ramp).

Thus, the inclination of the bearing top edge 13 takes a values ALPHA2 at temperature T2 (where ALPHA2 is different from ALPHA1).

The length of each tab and the distribution of the tabs along the ramp, in other words the slope of the straight line D interconnectiong their fixing points on the drum, are determined as a function of the coefficients of thermal expansion of the materials from which the ramp, the drum, and the tabs are made, in such a manner that the change in inclination of the tracks on the tape (due to anisotropic expansion of the tape) is exactly compensated by the change in inclination of the ramp.

Figure 6:
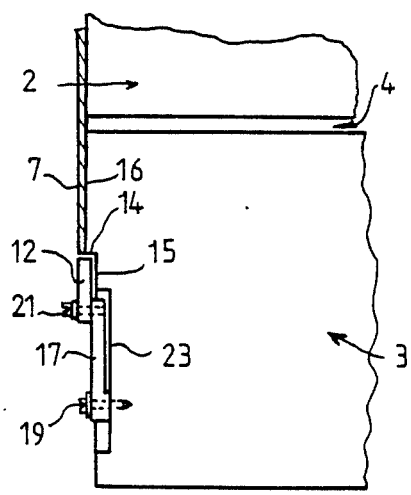
FIG. 6 is a section on VI—VI of FIG. 5.

The embodiment shown in FIGS. 5 and 6 merely constitutes a special case in which the thermal expansion coefficient of the drum (e.g. made of aluminum) and the transverse thermal expansion coefficient of the tape (e.g. made of a material known under the commercial name Mylar) are very close to each other. If these two coefficients were very different, the thermal expansion of the tape relative to the drum would give rise to movement in rotation and in translation. In such a case, it would be necesary to fix the end 12A of the ramp by means of an additional tab (of shorter length than the adjacent tab 18), rather than by means of a screw.

Similarly, it has been mentioned that the respective thermal expansion coefficients of the drum and of the ramp are close to each other. Nevertheless, the invention also applies to these items having different coefficients of thermal expansion. Under such circumstances the tabs must be provided with a degree of freedom in rotation relative to the drum in order to take account of the differential elongation between the ramp and the drum. Thus, the screws 19 and 20 need to allow small amplitude rotation of their respective tabs 17 and 18.

Figure 7:
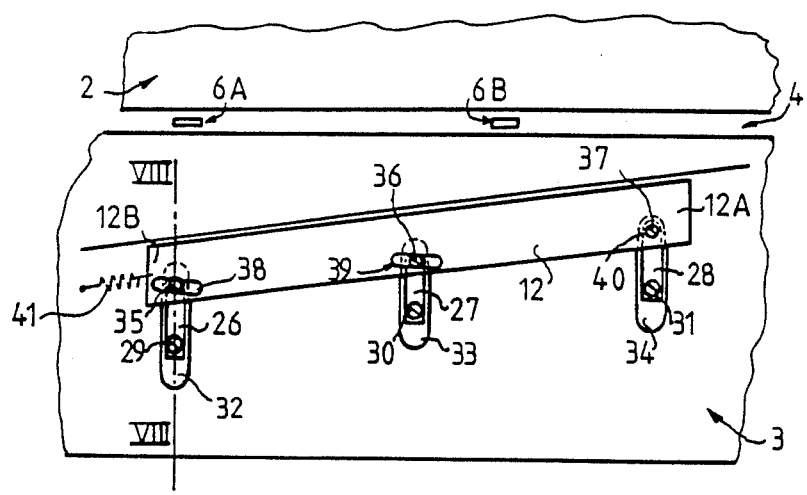
FIG. 7 is a view similar to FIG. 5 showing a variant embodiment.
Figure 8:
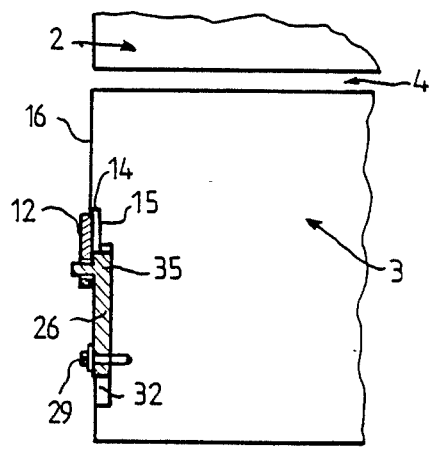
FIG. 8 is a section on VIII—VIII of FIG. 7.

FIGS. 7 and 8 show a second embodiment of the invention which constitutes a variant of the embodiment shown in FIGS. 5 and 6.

The ramp 12 is linked to the drum by means of elongate ties 26, 27, and 28 which are parallel to the axis of the drum and which are fixed to the drum by respective screws 29, 30, and 31. The ties are distributed along the ramp. In the example shown in FIG. 7, there is a tie 26 at one end 12B of the ramp, a tie 27 at its middle, and a tie 28 at its other end 12A.

Each tie is disposed in a hollow 32, 33, or 34 of generally complementary shape provided on the bottom drum 3 beneath the shoulder 14 defining the setback zone which receives the ramp.

The ties and the ramp overlap with the bottom portion of the ramp overlying the top portions of the ties, each of which has a respective axially-directed peg 35, 36, or 37. Each peg co-operates with an opening 38, 39, or 40 provided in the ramp. The ties are intended to make it possible to adjust the position of the ramp on the drum accurately. In a variant, the pegs could be fixed directly on the drum without intermediate components.

The opening 40 close to the end 12A is complementary in shape to the peg 37 (on the tie 28) with which it is associated. The peg 37 thus constitutes an invariant reference point. The other openings are elongate and of a width suitable for sliding in translation relative to the pegs which remain fixed.

The longitudinal axes of the openings 38 and 39 are slightly inclined relative to the longitudinal direction of the ramp.

A resilient member such as a spring 41 has one end fixed to the end 12B of the ramp (the end furthest from the end 12A which is connected to the drum via the peg 37 constituting the invariant point), and the other end of the spring 41 is fixed to the drum.

The materials from which the ramp and the drum are made have different coefficients of thermal expansion. For example, the drum may be made of an aluminum alloy and the ramp may be made of steel. The drum and the ties are made of materials whose respective coefficients of thermal expansion are identical.

When the temperature of the ambient air (and/or of the drum/tape assembly) changes from T1 to T2, differential longitudinal expansion occurs between the drum and the ramp. The length of the ramp varies and the ramp slides relative to the fixed pegs in the direction determined by the inclined openings 38 and 39.

As a result, the translation motion of the ramp due to thermal expansion includes a component extending transversely to its axis. Since the end 12A of the ramp is fixed to an invariant reference point corresponding to the peg 37, the translation movement of the ramp is thus transformed into a rotation movement about a radial axis embodied by the peg 37.

The inclination of the elongate opening 38 and 39 is determined in such a manner that the radial axis rotation of the ramp causes the ramp to change its inclination so as to compensate the change in inclination of the tracks on the tape due to the anisotropic deformation of the tape.

The remark made above with reference to FIGS. 5 and 6 concerning the respective coefficients of thermal expansion of the drum and of the ramp apply to the embodiment shown in FIGS. 7 amd 8. Consequently, when these two coefficients are different, the end peg 37 is associated with an elongate opening 37 whose axis runs parallel to the drum axis in order to allow the ramp to move in translation.

Figure 9:
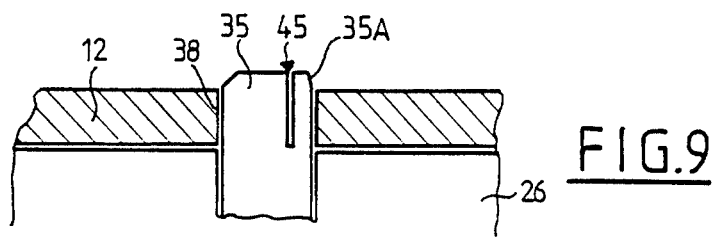
FIG. 9 is a section view on a larger scale through the link means of the ramp shown in FIGS. 7 and 8.

The pegs 35, 36, and 37 shown in FIGS. 7 and 8 are shown in greater detail in section in FIG. 9 which shows the peg 35. The peg has a slot 45 disposed in an axial plane which is offset relative to its diameter, thereby defining a small-size cylindrical segment 35A for acting as a spring. The diameter of the peg is slightly greater (or equal) to the diameter of the opening 38 provided in the ramp 12, such that when the ramp is put into place on the peg, the small sized cylindrical segment 35A tilts towards the other cylindrical segment by elasticity, and as a result the ramp is guided on the peg without any slack.

All of the above description refers to a ramp which is disposed helically around the drum with the bottom edge of the tape bearing against a continuous edge of the ramp.

This is merely a particular example of bearing means in accordance with the invention, which could equally well be constituted by a plurality of bearing points in alignment which are separated by empty zones where the edge of the tape has no surface to bear against. Thus, the ramp may be constituted by a strip whose top portion is cut out so as to form crenelations, or a plurality of separate strip segments may be provided whose top edges are in alignment (in the developed view).

As for the various embodiments shown and described, the tape has its bottom edge bearing against the bearing means, with the bottom edge constituting the reference edge. In a variant, the bearing means may be disposed in such a manner as to bear against the top edge of the tape.

We claim:

1. A device for guiding a magnetic tape suitable for being wound helically around a cylindrical drum and for running past at least one magnetic head driven in rotation around the periphery of a slot provided in an equatorial plane of the drum, the device being of the type comprising elongate bearing means linked to the drum and defining at least two bearing points against which one of the edges (bottom edge or top edge) of the tape may bear, the device including link means linking the bearing means to the drum and suitable for modifying the inclination of the bearing means as a function of temperature, said link means being suitable under the effect of differential thermal expansion to cause the bearing means to rotate about a radial axis (extending transversely to the axis of the drum) passing through a point which is invariant in rotation, and whose position is fixed regardless of temperature.

2. A device according to claim 1, wherein the bearing means are constituted by a helical ramp.

3. A device according to claim 2, wherein the link means are constituted by fixing members each of which is suitable for providing linear expansion whose value is a function of the position of the corresponding member along the ramp.

4. A device according to claim 3, wherein the link means comprise a set of tabs distributed along the ramp and disposed parallel to the axis of the drum, each tab being fixed at one of its ends to the drum and at its other end to the base of the ramp, said tabs being constituted by a material whose coefficient of thermal expansion is different at least from that of the material constituting the drum, said tabs also being of increasing length depending on their position along the ramp.

5. A device according to claim 4, wherein one of the ends (in the longitudinal direction) of the ramp is fixed to the drum in such a manner as to constitute an invariant reference point.

6. A device according to claim 3, wherein the ramp and the drum are made of aluminum alloy and the tabs are made of an alloy of iron and nickel known under the trademark Invar.

7. A device according to claim 2, wherein the link means are suitable for allowing the bearing means to lengthen longitudinally relative to the drum by thermal expansion, and for transforming such longitudinal elongation into rotary motion about a radial axis.

8. A device according to claim 7, wherein the ramp and the drum are made of materials having different coefficients of thermal expansion, with the link means comprising a set of pegs distributed along the drum in an axial direction and projecting from the surface thereof, said pegs being suitable for co-operating with openings provided in the ramp, said openings being generally elongate in shape along a direction which is inclined relative to the longitudinal direction of the ramp, and being of a width such as to constitute guide openings.

9. A device according to claim 8, wherein the opening provided at one of the ends of the ramp is complementary in shape to the associated peg, such that said peg constitutes an invariant reference point in rotation.

10. A device according to claim 8, wherein each peg is fixed to the drum via position-adjusting means.

11. A device according to claim 8, wherein each peg has a diameter which is slightly greater than or equal to the diameter of the opening provided in the ramp, and includes an axial slot defining a small-sized cylindrical segment intended to act as a spring.

12. Apparatus for recording and/or reading information on a magnetic tape, said apparatus being provided with a device according to claim 1.

* * * * *